United States Patent
Noehte et al.

(10) Patent No.: US 6,881,476 B2
(45) Date of Patent: Apr. 19, 2005

(54) ADHESIVE SECURITY TAPE

(75) Inventors: Steffen Noehte, Weinheim (DE); Matthias Gerspach, Heidelberg (DE); Christoph Dietrich, Heidelberg (DE); Annouschka Blazejewski, Hamburg (DE); Stefan Stadler, Hamburg (DE)

(73) Assignee: tesa scribos, GmbH, Heidelberg (DE)

( * ) Notice: Subject to any disclaimer, the term of this patent is extended or adjusted under 35 U.S.C. 154(b) by 0 days.

(21) Appl. No.: 10/201,645

(22) Filed: Jul. 24, 2002

(65) Prior Publication Data

US 2003/0096105 A1 May 22, 2003

(30) Foreign Application Priority Data

Nov. 19, 2001 (DE) ........................................ 101 56 793

(51) Int. Cl.⁷ ................................................ B32B 7/00
(52) U.S. Cl. ...................... 428/332; 428/343; 428/344; 428/354
(58) Field of Search ................... 428/332, 343

(56) References Cited

U.S. PATENT DOCUMENTS

| | | | |
|---|---|---|---|
| 5,510,171 A | 4/1996 | Faykish | 428/195 |
| 5,658,411 A * | 8/1997 | Faykish | 156/233 |
| 5,797,492 A | 8/1998 | Seki et al. | 206/387.1 |
| 5,851,615 A * | 12/1998 | Kay | 428/40.1 |
| 5,866,236 A * | 2/1999 | Faykish et al. | 428/195.1 |
| 5,958,650 A | 9/1999 | Wolleb et al. | 430/270.19 |
| 6,266,166 B1 | 7/2001 | Katsumata et al. | 359/3 |
| 6,372,341 B1 * | 4/2002 | Jung et al. | 428/354 |
| 6,436,483 B1 * | 8/2002 | Palmasi et al. | 427/510 |
| 2003/0156524 A1 | 8/2003 | Stadler et al. | 369/103 |
| 2003/0161018 A1 | 8/2003 | Stadler et al. | 359/3 |
| 2003/0165746 A1 | 9/2003 | Stadler et al. | 430/1 |
| 2003/0179277 A1 | 9/2003 | Stadler et al. | 347/224 |
| 2004/0053140 A1 * | 3/2004 | Stadler et al. | 430/1 |

FOREIGN PATENT DOCUMENTS

| | | |
|---|---|---|
| DE | 37 23 522 | 2/1989 |
| DE | 195 37 829 | 10/1996 |
| DE | 198 08 288 | 9/1999 |
| DE | 100 39 370 A1 | 2/2002 |
| DE | 100 39 374 | 2/2002 |
| DE | 100 39 372 A1 | 3/2002 |
| EP | 0 528 134 | 2/1993 |
| EP | 0 585 076 | 3/1994 |
| EP | 0 613 126 | 8/1994 |
| EP | 0 660 262 A2 | 6/1995 |
| GB | 2 211 760 A | 7/1989 |
| WO | 00/17864 | 3/2000 |
| WO | WO 01/84544 A1 | 11/2001 |
| WO | WO 02/46845 A1 | 6/2002 |

* cited by examiner

*Primary Examiner*—Monique R. Jackson
(74) *Attorney, Agent, or Firm*—Nixon & Vanderhye, P.C.

(57) ABSTRACT

An adhesive security tape comprises a polymer film whose refractive index and/or interface structure can be changed locally by heating. Disposed below the polymer film is an absorber layer comprising an absorber dye set up at least partly to absorb a write beam directed onto the absorber layer, to emit at least some of the generated heat to the polymer film locally, and in doing so to undergo local change itself. Below the absorber layer there is an adhesive layer. The adhesion between the adhesive layer and the absorber layer is greater than the adhesion to the polymer film. There is preferably a partly transparent reflection layer between the polymer film and the absorber layer.

36 Claims, 2 Drawing Sheets

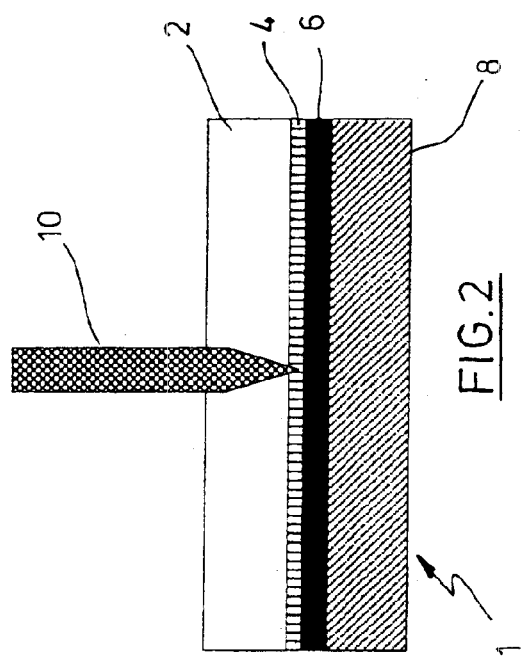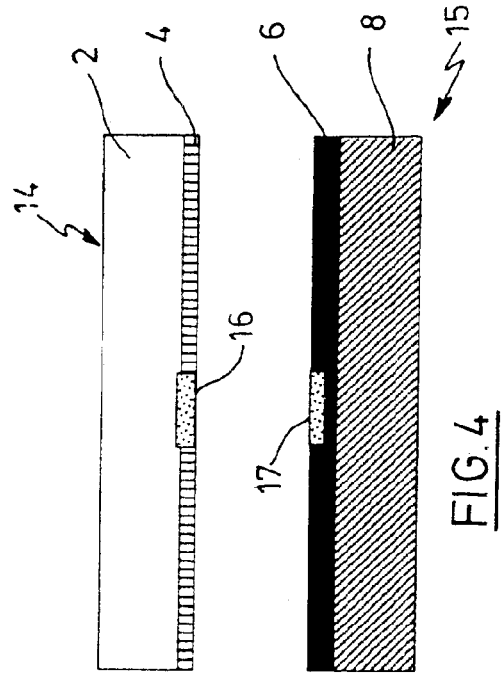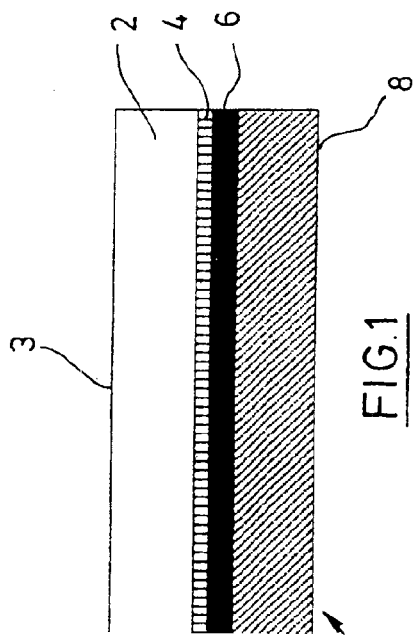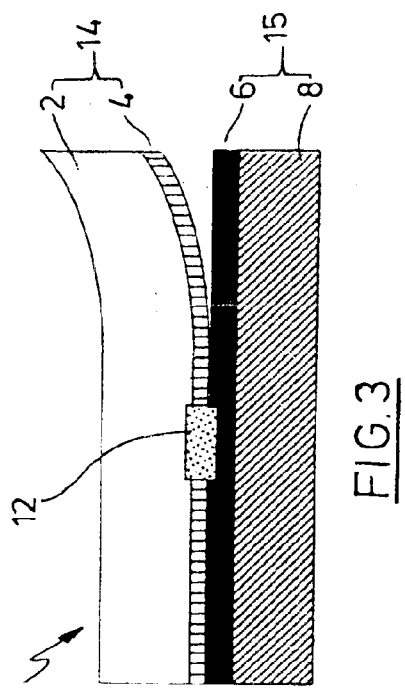

ADHESIVE SECURITY TAPE

Figure 5:
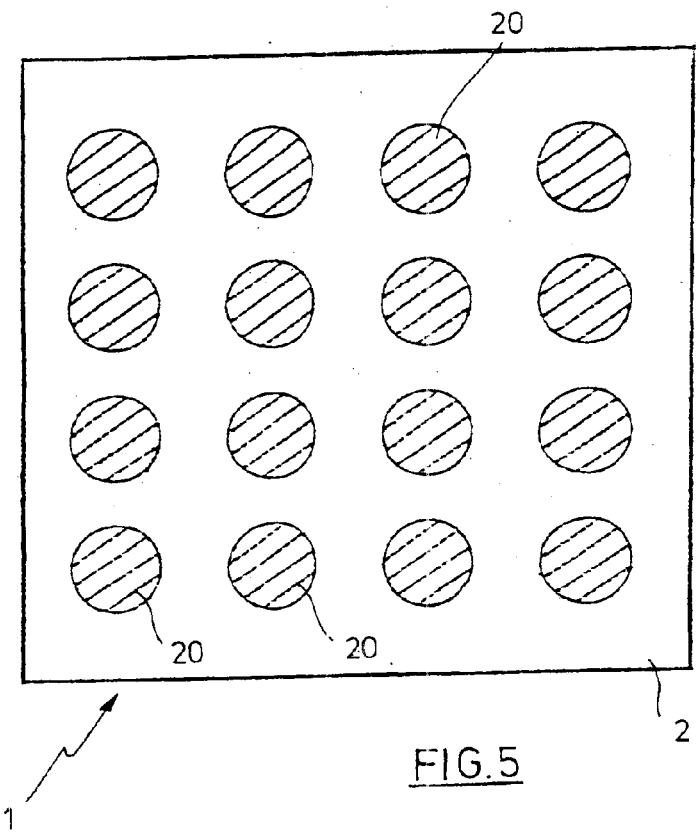

The invention relates to an adhesive security tape and also to a process for entering holographic information into such an adhesive security tape.

In order to make the unauthorized opening of packages and cartons visible, tapes referred to as "tamper evident" tapes (adhesive security tapes) have been in use for some time. After a package has been sealed, the appearance of these adhesive security tapes is unremarkable. When the adhesive security tape is peeled from the package, however, an indicium (e.g., "opened" or "alert") becomes visible and remains clearly visible even following resealing. As a result it is obvious that the package or the carton has been opened.

A disadvantage of these known adhesive security tapes is that the material is freely available. Consequently, a package could be opened and later sealed again using fresh adhesive security tape; where appropriate, the package itself would have to be replaced. At any rate, the unauthorized opening would not be visible.

It is an object of the invention to provide an adhesive security tape having increased anti-counterfeiting security.

The adhesive security tape of the invention comprises a polymer film whose refractive index and/or interface structure can be changed by heating; preferably, the polymer film serves as the outer ply and as the bearing structure of the adhesive security tape. Disposed beneath the polymer film is an absorber layer which comprises an absorber dye and is set up at least partly to absorb a write beam directed onto the absorber layer, to transmit at least some of the generated heat to the polymer film, locally, and in doing so to undergo local change itself. Disposed beneath the absorber layer is an adhesive layer. The adhesion between the adhesive layer and the absorber layer is greater than the adhesion to the polymer film.

By means of a write beam, the polymer film and the absorber layer can be changed locally, and this can be exploited for the purpose of entering information, particularly in the form of holograms. The adhesive security tape of the invention is therefore individualizable, being dispatched via a secure distribution route with user-specific information or else inscribed by the user itself. Counterfeiting or copying is therefore made much more difficult. For example, a package which has been opened cannot easily be closed using a new adhesive security tape, since it is very difficult to copy an adhesive security tape which has been provided with user-specific information.

The tamper evident effect is brought about by the fact that the attempt to peel the adhesive security tape from a package is accompanied by delamination between the absorber layer and the polymer film. This is because the adhesion between the adhesive layer and the absorber layer is greater than the adhesion to the polymer film, a phenomenon which can be brought about by an appropriate selection of the anchoring parameters between the layers (the provision of interlayers as well being a possibility, e.g., a reflection layer; see below). In the case of delamination, therefore, the absorber layer remains on the package. Since when information is written both the absorber layer and the polymer film are locally changed, both layers carry information, in the form of a hologram for example (see below). In the course of the attempt to reseal the package, the detached polymer film must be reconnected with the absorber layer. It is, however, virtually impossible to match a region with entered information (i.e., a hologram in particular) in the polymer film in a precise fit with the associated region or hologram of the absorber layer. On irradiation with light, especially coherent light from a laser, the differences become evident. The adhesive security tape of the invention is therefore not just proof against counterfeiting but also reliably indicates whether an attempt has been made to open the package sealed with the adhesive security tape.

In one preferred embodiment of the invention, the interface structure of the polymer film can be changed locally by heating, and holographic information can be written in by way of the local interface structure of the polymer film. In that case the absorber layer is set up to absorb a write beam and, in so doing, to take on an interface structure which corresponds to the local interface structure of the polymer film.

In order to introduce holographic information into the adhesive security tape in this embodiment, a laser beam serving as a write beam can be directed (preferably focused) onto the absorber layer so that the light energy is absorbed locally there and is converted into heat energy. This heat energy is given up to the polymer film. As a result, the interface structure or topography of the polymer film is changed, especially at the interface facing the absorber layer. Particularly if the laser beam is irradiated in short periods (in pulsed form), the material change in the polymer film that leads to the local change of the interface structure remains limited to a very narrow volume as a result of the generally poor thermal conductivity of the polymer. The local interface structure of the polymer film is also impressed on the directly adjacent absorber layer or the absorber layer connected mechanically to the polymer film via a thin interlayer (see below), so that the absorber layer takes on an interface structure which corresponds to the local interface structure of the polymer film.

If, with this embodiment of the adhesive security tape, the holographic information is entered point by point, the region assigned to one point typically having linear lateral dimensions in the order of magnitude of from 0.5 $\mu$m to 1 $\mu$m, the height profile of the polymer film typically changes by from 50 nm to 500 nm, depending in each specific case on the properties and operating conditions of the write beam and also the properties of the polymer film and of the absorber layer. The point pattern, i.e., the center distance between two points ("pits"), is typically situated within the range from 1 $\mu$m to 2 $\mu$m. The general rule is that shorter light wavelengths of the write beam permit a closer point pattern.

In this case a hologram is formed by the surface structure or interface structure of the polymer film. The hologram is, in other words, a relief hologram, which is preferably read in reflection. A relief depth of about 150 nm is ideal for the reproduction of the hologram in reflection using light with a wavelength of about 600 nm, since the maximum for the diffraction efficiency is one quarter of the light wavelength.

The surface structure of the absorber layer forms a counterpiece to the relief of the polymer film. This counterpiece contains the entire holographic information which is also present in the hologram of the polymer film. Since holograms generally give the same image on reconstruction if, in the hologram structure, the local values are confused with their counter-parts (i.e., peak with valley in the case of relief holograms, regions of high refractive index with regions of low refractive index in the case of phase holograms, and regions of high absorption with regions of low absorption in the case of amplitude holograms). If in the relief hologram of the absorber layer the changes in the height profile have the preferred value of about 150 nm, this relief is situated exclusively in the absorber layer, given an absorber layer thickness of more than about 200 nm, and not in the adhesive layer disposed below it.

In the case of the elucidated embodiment of the adhesive security tape, if no attempt has been made to detach the adhesive security tape, the interface structures of the polymer film and of the absorber layer are situated with accurate fit in one another and form a uniform hologram which can easily be read by reflection at the interface structure of the polymer film. On the attempt to peel off the adhesive security tape, the polymer film and the absorber layer part, so that holograms independent of one another are produced therein and cannot be combined again with accurate fit to form a uniform hologram.

In the case of another preferred embodiment of the adhesive security tape, the refractive index of the polymer film can be changed locally by heating, and holographic phase information can be written in the polymer film by way of the local optical path length. In this case it is intended when reading information to pass a beam through the polymer film in transmission (in which case a reflection layer at the polymer film interface facing the absorber layer may be useful; see below). In the polymer film it is therefore possible to deposit phase information locally, i.e., in a region envisaged for the storage of one information unit, by changing the refractive index in this region by means of heating. The local change in the refractive index brings about a change in the optical path length of the radiation used when reading information from the polymer film (and which the polymer film transmits). Indeed, the optical path length is the product of the geometric path length and the refractive index. By way of a change in the refractive index, therefore, it is possible to influence the local phase position of the radiation used when reading information, i.e., to store the desired holographic information as phase information. A hologram produced in the polymer film in this way is, accordingly, a refractive phase hologram.

The absorber dye may be set up so as to undergo local change in its optical properties on absorbing a write beam. In that case it is particularly advantageous if the absorber dye locally changes its absorption characteristics; for example, by being partly or fully bleached out by the write beam. Into an absorber layer comprising an absorber dye of this kind it is possible, using the write beam which brings about the local heating of the polymer film at the same time, to enter an absorption hologram (amplitude hologram) which corresponds in terms of its information content to the hologram produced in the polymer film. The absorption hologram is read in transmission, the light used for reading preferably being reflected at the interface between the absorber layer and the adhesive layer, so as to penetrate the absorber layer twice. If the polymer film changes only its refractive index locally on heating, and not the interface structure, an absorber layer in which an absorption hologram is formed is particularly suitable for realizing the tamper evident effect.

A particularly sharp contrast can be achieved by means of hybrid forms of the types of hologram described. In this case, a relieflike interface structure and variations in the refractive index are brought about in the polymer film by means of the write beam. At the same time, the absorber layer can be provided with a corresponding interface structure and, where appropriate, with an absorption hologram.

Disposed between the polymer film and the absorber layer there is preferably a partly transparent reflection layer, the adhesion between the polymer film and the reflection layer preferably being greater than the adhesion between the reflection layer and the absorber layer. The reflection layer may comprise aluminum and preferably has a thickness in the range from 1 nm to 50 nm, although other thicknesses are possible. It is partly transparent so that the write beam penetrates through to the absorber layer when information is being entered. Since the reflection layer is thin, it has virtually no hindering effect on the emission of heat to the polymer film. Furthermore, it is able readily to take on the relieflike interface structure of the polymer film and to transfer it to the absorber layer. In the attempt to detach the adhesive security tape, the reflection layer clings to the polymer film and not to the absorber layer. The reflection layer makes it easier to read entered holographic information in reflection, which in the majority of cases constitutes a favorable geometry. Furthermore, the reflection layer simplifies the focusing of the write beam (see below).

In principle it is also possible to provide a reflection layer between the absorber layer and the adhesive layer. This makes it easier to read an absorption hologram which has been introduced into the absorber layer. Preference, however, is given to an embodiment of the adhesive security tape wherein the absorber layer is disposed directly on the adhesive layer.

Suitable materials for the polymer film are, for example, polypropylene, polyvinyl chloride, polyesters, polyethylene terephthalate (PET), polyethylene naphthalate, polymethylpentene (PMP; also poly-2-methylpentene), and polyimide. The thickness of the polymer film is preferably such that it is self-supporting and serves as a bearing structure of the adhesive security tape, and is additionally able to exert a protective function for holographic structures which have been entered (and which are located in the vicinity of the absorber layer). Suitable thicknesses are situated within the range between 10 $\mu$m and 100 $\mu$m, although other thicknesses are likewise possible. It is conceivable to use the adhesive security tape as a kind of seal, in which case a low material thickness is adequate, but also as an adhesive tape for the secure sealing of packages or cartons, in which case greater material thicknesses are more suitable.

The polymer film may have been oriented and is preferably biaxially oriented, by being pretensioned, for example, in two directions perpendicular to one another within its plane in the course of production. This generally raises the strength of the polymer film. Moreover, in the case of an oriented polymer film a high energy density is stored in the film material. As a result of local heating with deposition of a relatively small amount of energy per unit area, e.g., by means of a write beam of a writing device that is absorbed in the absorber layer, it is possible to achieve a relatively large change in material with a change in the local properties (such as interface structure or refractive index) of the polymer film.

Besides the absorber dye, the absorber layer preferably comprises a binder. As explained, the absorber layer makes it possible for the polymer film to undergo local heating, sufficient to change the local properties of the polymer film, for a relatively low write beam intensity. The absorber layer may be thin and preferably has a thickness in the range from 0.1 $\mu$m to 10 $\mu$m; other thicknesses are likewise possible. Preferred binders which serve as a matrix for the molecules of the absorber dye are, for example, optically transparent polymers, e.g., of polymethyl methacrylate (PMMA), or, in the case of applications for higher temperatures, of polymethylpentene, polyether ether ketone (PEEK) or polyetherimide.

The absorption maximum of the absorber dye ought to coincide with the light wavelength of the write beam used in order to obtain efficient absorption. For a light wavelength of 532 nm for a write beam generated by a laser, for example, dyes from the Sudan Red family (diazo dyes) or (for particularly polar plastics) Eosine Scarlet are suitable. For the customary laser diodes with a light wavelength of from 650 to 660 nm or 685 nm, green dyes are more suitable, examples being those from the styryl family (which are common laser dyes).

The adhesive layer may comprise, for example, an adhesive comprising an aqueous acrylate emulsion, or may be composed of functionalized poly(meth)acrylate. Other materials may also be used for the adhesive layer. A preferred adhesive layer thickness is about 20 $\mu$m, although other thicknesses are possible. If the adhesive security tape is not supplied in roll form, it is advisable to cover the adhesive layer in the delivery state, using a silicone paper, for example.

Holographic information can be entered into the adhesive security tape by calculating holographic information contained in a hologram of a storage object as a two-dimensional arrangement and directing a write beam of a write device, preferably a laser lithography device, onto the absorber layer and directing it in accordance with the two-dimensional arrangement in such a way that the local refractive index and/or interface structure of the polymer film is adjusted in accordance with the holographic information and the absorber layer is locally changed in accordance with the holographic information. Since the physical events associated with the scattering of light from a storage object are known, it is possible, for example, to simulate a conventional structure for producing a hologram (in which coherent light from a laser which is scattered by an object (storage object) is brought into interference with a coherent reference beam and the resultant interference pattern is recorded as a hologram) by means of a computer program and to calculate the interference pattern or the modulation of local properties (refractive index and/or interface structure) of the polymer film as a two-dimensional arrangement (two-dimensional array).

The resolution of a suitable laser lithography device is typically about 50 000 dpi (dots per inch). Accordingly, the polymer film can be changed locally in areas of pits with a size of from about 0.5 $\mu$m to 1 $\mu$m. The write speed and other details depend, among other things, on the parameters of the writing laser (laser output, light wavelength) and pulse duration and also on the properties of the polymer film and of the absorber layer.

The write beam is preferably directed from the polymer film side onto the adhesive security tape. In this case it is possible to enter information, preferably in the form of holograms, if the adhesive layer does not have good optical properties or if the adhesive security tape has already been adhered to a nontransparent substrate (e.g., a package or carton).

If the adhesive security tape has a partly transparent reflection layer, as set out earlier on above, the write beam can be focused by evaluating the reflection returned from the reflection layer. A comparable reflection would occur in the case of reflection at the interface between two media differing in refractive index if no reflection layer is disposed there, but in the present case it is markedly intensified by the reflection layer. The evaluation may be made, for example, by way of the magnitude of the reflection, measured by means of a detector, in which case the precise focusing can be determined, for example, by means of calibration measurements. If the reflection layer is very thin (from about 1 nm to 50 nm, but also thicker or thinner), it can be assumed that the write beam focus adjusted onto the reflection layer practically coincides with the optimum focus in the absorber layer. When entering information, therefore, the absorber layer can be heated practically in an optimum way.

As mentioned, the holographic information is preferably entered in the form of pits of predetermined size. The term "pit" is to be understood more generally in the sense of a changed region, and is not restricted to its original meaning (hole or depression). The holographic information can be stored in binary-encoded form in a pit. In other words, in the region of a given pit the local properties of the polymer film (or of the absorber layer) adopt only one of two possible basic forms (basic values). These basic forms are preferably markedly different from one another, so that intermediate forms which occur in practice and which are close to one or the other basic form can be assigned unambiguously to one or the other basic form, in order that the information is stored reliably and unambiguously.

Alternatively, the holographic information can be stored in continuously encoded form in a pit, in which case the local properties of the polymer film (or of the absorber layer) in the pit are adjusted in accordance with a value from a predetermined range of values. If, for example, the local interface structure of the polymer film is to be adjusted, the local maximum change in height of the interface structure in the pit is therefore selected from a predetermined range of values. This means that, in a given pit, the interface structure of the polymer film is able to adopt intermediate forms between two basic forms, so that the maximum height change of the prevailing intermediate form adopts a value from a predetermined range of values whose limits are set by the maximum height changes of the two basic forms. In this case, therefore, the information can be stored in "gray stages", so that each pit is assigned the information content of more than 1 bit. The same applies to adjusting the local refractive index of the polymer film.

In order to read holographic information from the adhesive security tape of the invention, light, preferably coherent light (e.g., from a laser) can be directed extensively onto the polymer film of the adhesive security tape. The light is modulated by the locally varying properties of the polymer film (refractive index and/or interface structure). As a reconstruction of the information contained in the irradiated region, a holographic image is detected at a distance from the data storage medium, using, for example, a CCD sensor which is connected to a data processing device.

Preferably, the holographic information is read in reflection, with the light used for reading being reflected after passing through the polymer film. In this case the holographic film is produced from light which has passed twice through the polymer film and in doing so has been modulated, for example, by local variations in the refractive index and/or in the interface structure of the polymer film. In principle, it is also possible to read in reflection when no separate reflection layer is present; a prerequisite is merely the presence of an interface between two media with different refractive indices. The reflection layer between the polymer film and the absorber layer, as elucidated, nevertheless improves the reproduction of the holographic image considerably.

By "extensive" is meant an area which is significantly greater than the area of one pit. In this sense, for example, an area of 1 mm$^2$ is extensive. For the scheme in accordance with which the information is deposited and read, there are a large number of different options. It is conceivable to read a hologram from the polymer film in one go, by irradiating the entire area of that region of the adhesive security tape that has been set up as a hologram in one go. Particularly in the case of relatively large areas, however, it is advantageous to divide the information that is to be stored over a number or large number of individual regions (for example, each with an area of 1 mm$^2$) and to read the information in one go only from a predetermined individual region.

The reading of information is accompanied, as a result of the locally varying properties of the polymer film, by differences in the travel time of the lightwaves starting out from different points; that is, essentially, by a periodic phase modulation (especially in the case of local adjustment of the refractive index or of the interface structure of the polymer film). The region of the polymer film that is covered by the light thus acts like a diffraction grating, deflecting incident light in a defined manner. The deflected light forms an image of the storage object, which represents the reconstruction of stored holographic information. The same applies to the reading of information from the absorber layer when the polymer film has been removed.

In principle it is possible with the adhesive security tape to utilize holographic information from different kinds of storage objects. For example, the information contained in images, such as photographs, logos, texts, etc., for example, can be written and read. It is also possible to enter machine-readable data. This is done, for example, in the form of what are known as data pages, where the holographic information contained in a hologram of a graphic bit pattern (representing the data information) is entered, as explained, into the polymer film or absorber layer. On reading, a holographic image of this graphic pattern is produced. The information contained therein can be detected, for example, by means of a precisely adjusted CCD sensor and can be processed by associated evaluation software. For the reproduction of images for which high accuracy is not a factor it is sufficient in principle to provide just a simple ground glass plate or, for example, a camera with an LCD screen. For the holographic storage of machine-readable data it is advantageous that the information need not be read sequentially but instead that a whole data set can be captured at once, as explained. Should damage occur, despite the protection of the information storage regions of the adhesive security tape, as a result of the exposed outside of the polymer film, this generally leads not to a loss of data but instead only to a deterioration in the resolution of the holographic image which is reconstructed when the information is read. This is generally not a problem. Accordingly, there are numerous possibilities for the individualization of the adhesive security tape which lead to a high level of proof against counterfeiting.

Background information on relief holograms, phase holograms, and amplitude holograms which can be stored using a polymer film can be found in the laid-open specifications belonging to the international patent applications PCT/EP01/05932, PCT/EP01/05933 and PCT/EP01/05931.

Figure 6:
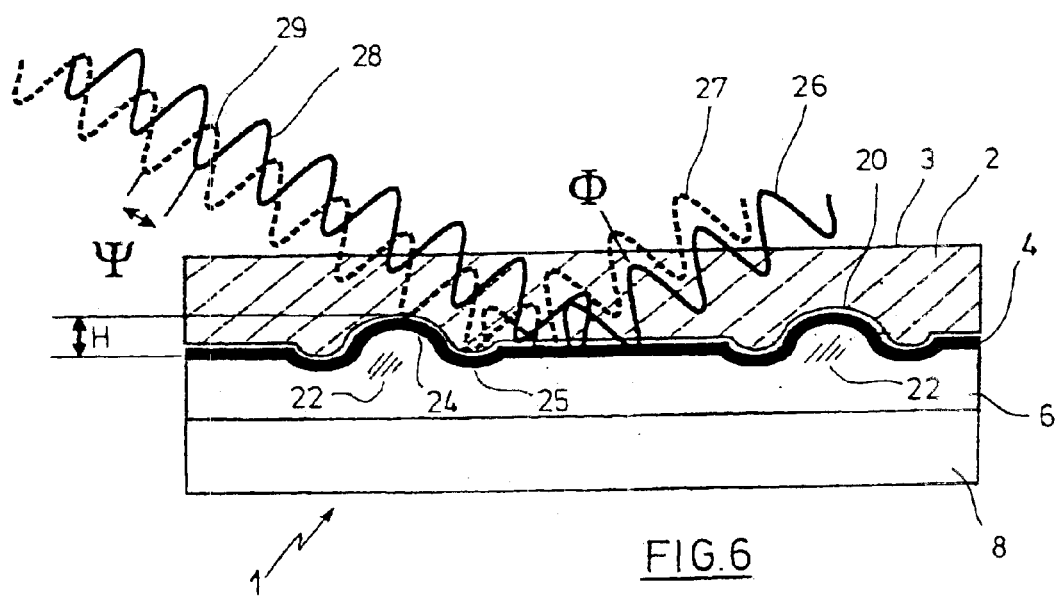

The invention is illustrated below with reference to examples. In the drawings,

FIG. 1 shows a diagrammatic longitudinal section, not to scale through one embodiment of the adhesive security tape of the invention, FIG. 2 shows a diagrammatic view which illustrates how holographic information is entered into the adhesive security tape of FIG. 1 by means of a write beam, FIG. 3 shows a diagrammatic view which illustrates how, in the case of an attempt to detach the adhesive security tape of FIG. 1 from a substrate, an upper part separates from a lower part of the adhesive security tape, FIG. 4 shows a diagrammatic view in which the upper part and the lower part of the adhesive security tape of FIG. 1 are completely separate, FIG. 5 shows a diagrammatic plan view of a region of the adhesive security tape of FIG. 1 into which holographic information has been written, greatly enlarged, and FIG. 6 shows a diagrammatic longitudinal section through a region of the adhesive security tape of FIG. 1 in which holographic information has been written, greatly enlarged, with the reading of information being illustrated (not to scale).

FIG. 1 illustrates diagrammatically a section of an adhesive security tape 1 according to one embodiment of the invention, in longitudinal section. The adhesive security tape 1 comprises a polymer film 2 which acts as outer layer and bearing structure of the adhesive security tape 1 and has an outside 3. Below the polymer film 2 and adjacent to the polymer film 2 there is arranged a partly transparent reflection layer 4. Below this there is an absorber layer 6 with an absorber dye. The bottommost layer is formed by an adhesive layer 8, which in the as-supplied state of the adhesive security tape 1 is preferably covered by a removable film or a silicone paper. The terms "top" and "bottom" refer here and below to the representation shown in the figures; the adhesive security tape can, however, be used in any other orientation.

In the example, the polymer film 2 is a biaxially oriented polyester film having a thickness of 50 µm. Thinner or thicker films are likewise possible. Also suitable are films made of other materials, as discussed earlier on above.

The reflection layer 4 in the example is composed of aluminum applied by vapor deposition to the underside of the polymer film 2, and has a thickness of about 10 nm. In the case of such a layer thickness, the transmission is approximately 50%. Preferred layer thicknesses are in the range from 1 nm to 50 nm, although smaller or larger figures are possible. With such lower thickness, the reflection layer 4 is partly transparent, so that a write beam (e.g., of a laser lithography device; see below) directed onto the outside 3 of the polymer film 2 is able to pass through the reflection layer 4 to reach the absorber layer 6.

In the example the absorber layer 6 contains the absorber dye Sudan Red 7B, embedded in a matrix of Pleximid molding compund, which serves as binder. The thickness of the absorber layer is approximately 0.5 µm and is preferably situated within a range from 0.3 µm to 1.0 µm. Other layer thicknesses, however, are also possible.

The absorber dye Sudan Red 7B is particularly effective at absorbing light in the wavelength range around 532 nm; this wavelength is suitable for a write beam of a laser lithography device for the purpose of entering holographic information into the adhesive security tape 1. Examples of other absorber dyes have been indicated earlier on above. Thus green dyes, from the styryl family, for example, are suitable particularly for light wavelengths of 635 nm or from 650 to 660 nm or 685 nm, at which the laser diodes of current DVD instruments operate; laser diodes of this kind can be modulated directly, thereby making it much easier and less expensive to generate pulses. In the future, the range from 380 to 420 nm might also be of interest, if corresponding blue laser diodes are available commercially at favorable cost. For that purpose preference would then be given to using yellow absorber dyes, such as stilbenes substituted with weak donors and acceptors, donor-substituted nitroberizenes or coumarin dyes.

The concentration of the absorber dye in the absorber layer 6, in the example, is such that the absorber layer 6 has an optical density of approximately 0.3. Preferred optical densities lie within the range of 0.2 to 1.0; other figures are, however, likewise possible. The optical density is a measure of the absorption, based here on the light wavelength of a write beam. The optical density is defined as the negative base-ten logarithm of the transmission through the absorber layer, which coincides with the product of the extinction coefficient at the write beam wavelength used, the concentration of the absorber dye in the absorber layer 6, and the thickness of the absorber layer 6.

In the example, the adhesive layer 8 is prepared from an aqueous acrylate dispersion and has a thickness of 23±4 $\mu$m. Other layer thicknesses are likewise possible, and it is also possible to use other adhesives. The underside of the absorber layer 6 may be pretreated before applying the adhesive layer 8 in order to ensure better attachment of the adhesive layer 8.

In the example, the surface tension of the reflection layer 4 of aluminum is adjusted by flame pretreatment such that the anchoring or adhesion between the reflection layer 4 and the absorber layer 6 is weaker than the adhesion of the reflection layer 4 to the polymer film 2 and than the anchoring of the assembly of absorber layer 6 and adhesive layer 8 to a substrate to which the adhesive security tape 1 has been adhered. Suitable substrates include, in particular, varnished and unvarnished cardboard, such as is customary for packages and cartons.

FIG. 2 illustrates diagrammatically how holographic information can be written into the adhesive security tape 1 using a write beam 10 of a write device. The information is deposited in the form of a two-dimensional arrangement of pits. The term "pit" here is to be understood in the sense of an altered region of the polymer film 2 and absorber layer 6, in other words more generally than in its original meaning ("hole"). A pit has a typical dimension in the order of magnitude of 1 $\mu$m. Later on below, the operation is explained in more detail with reference to FIGS. 5 and 6.

In the example, the write device used is a laser lithography device. First of all the write beam 10 is focused so that it has its lowest cross section approximately in the absorber layer 6. The partly transparent reflection layer 4 is a great help here, since it guides the write beam 10 back into the write device, where the reflection is evaluated. The optical focusing system of the write beam 10 is adjusted until the position of the focus has been optimized. In the example, the focus is located within the thin reflection layer 4, which is the easiest to achieve. During the focusing operation, the write beam 10 can be operated at low power in order to prevent excessive heating in the vicinity of its focus.

In order to enter information into the polymer film 2, holographic information contained in the hologram of a storage object is first of all calculated as a two-dimensional arrangement. This can be carried out as a simulation of a classic structure for generating a photographically captured hologram, in which coherent light from a laser is scattered on the storage object and then brought into interference with a coherent reference beam, and the resulting interference pattern is recorded as a hologram. The two-dimensional arrangement (two-dimensional array) then contains the information required to direct the write beam of a laser lithography device. In the example, the laser lithography device possesses a resolution of approximately 50 000 dpi (i.e., about 0.5 $\mu$m). The write beam of the laser lithography device is guided in pulsed operation (typical pulse duration from about 10 ns to 10 $\mu$s for a beam power of about 1 mW to 20 mW for entering a pit) over the outside 3 of the polymer film 2, in order to enter the desired information sequentially into the polymer film 2 (or a preselected area of the polymer film 2) and also an adjacent zone of the absorber layer 6. The write beam 10 heats the absorber layer 6 in accordance with the two-dimensional array and so produces the pits.

As explained in more detail later on below with reference to FIG. 6, a hologram 12 is produced in this way; see FIG. 3. The hologram 12 consists of an arrangement of pits which are formed both in the polymer film 2 and in the absorber layer 6.

When the adhesive security tape 1 is adhered to a substrate (for example, a package; not included in the figures) and an attempt is made to detach the adhesive security tape 1 from the substrate, the reflection layer 4 separates from the absorber layer 6. This is because the adhesion between these two layers is lower than between the substrate, the adhesive layer 8, and the absorber layer 6, and is also lower than between the reflection layer 4 and the polymer film 2. FIG. 3 illustrates how in this way an upper part 14 (polymer film 2 with reflection layer 4) and a lower part 15 (absorber layer 6 with adhesive layer 8) of the adhesive security tape 1 are formed.

Since in the region of the hologram 12 both the polymer film 2 and the absorber layer 6 have been changed and carry holographic information, following the removal of the upper part 14 from the lower part 15 the upper part 14 bears a hologram fragment 16 and the lower part 15 bears a hologram fragment 17. FIG. 4 shows this state.

As long as the adhesive security tape 1 is still present as a unit, the hologram 12 can be read in reflection without problems (see also FIG. 6). Following the detachment of the upper part 14 from the lower part 15, the hologram fragments 16 and 17 can be read independently of one another, since they each contain the full holographic information. Therefore it is possible, for example, on the basis of the individualized information contained in the holograms 12 or 16 and 17, to determine the proper user of the adhesive security tape 1 even from the upper part 14 or the lower part 15 per se.

The attempt to reconnect the upper part 14 and the lower part 15 of the adhesive security tape 1 with one another without trace, in order to conceal, for example, the unauthorized opening of a package, is unsuccessful. The two hologram fragments 16 and 17 cannot be matched up again accurately. Deviations become visible when the holograms are read.

A number of details relating to the entering and reading of holographic information in the example are elucidated with reference to FIGS. 5 and 6.

FIG. 5 is a diagrammatic plan view of a section of the adhesive security tape 1, showing the arrangement of the pits, here designated 20, which are produced by the write beam of the laser lithography device. The distance between the centers of two adjacent pits 20 is preferably from about 1 $\mu$m to 2 $\mu$m. In the example a pit 20 has a diameter of approximately 0.8 $\mu$m. The typical dimension of a pit is preferably from about 0.5 $\mu$m to 2.0 $\mu$m. The shorter the wavelength of the write beam, the smaller the pits can be. Forms other than round pits 20 are likewise possible.

FIG. 6 illustrates the profile of the pits 20, which in the example are formed as a local interface structure of the polymer film 2 and of the absorber layer 6. In order to produce a pit 20 for information storage, the pulsed write beam of the write device is focused via the outside 3 of the polymer film 2 and through the partly transparent reflection layer 4 onto a zone 22, indicated by hatching in FIG. 6. At the beginning of this operation, the underside of the polymer film 2 (i.e., the interface with the reflection layer 4) and also the reflection layer 4 and the absorber layer 6 are still planar. Since the zone 22 lies within the region of the absorber layer 6, the light energy of the write beam is efficiently converted into heat there. Owing to the poor thermal conductivity of the material, there is a significant temperature increase within a closely confined volume, and the interface structure of the polymer film 2 is locally changed. This change is also transmitted via the reflection layer 4 to the interface of the absorber layer 6, pointing to the polymer film 2. In this way a pit 20 is formed, i.e., the local region in which the information is deposited. Associated with each pit 20 is a central recess 24 in the polymer film 2, which is surrounded by a peripheral, more or less annular elevation 25. The difference in level between the lowest point of the recess 22 and the highest point of the elevation 25, i.e., the local maximum change in height of the interface structure in the pit 20, is labeled H in FIG. 6. H is typically in the range from 50 nm to 500 nm, with values in the order of magnitude of 150 nm being particularly favorable for a light wavelength of approximately 600 nm which is used for reading (maximum for diffraction efficiency). The absorber layer 6 should be thick enough that the relieflike interface structure does not extend into the adhesive layer 8.

In a pit 20 the information can be stored in binary-encoded form, with H adopting only two different values (with one of the two values preferably being 0). It is also possible to store information in continuously encoded form in a pit 20, with H for any given pit 20 being able to adopt a value selected arbitrarily from a predetermined range of values. In graphical terms, storage in binary-encoded form makes a pit "black" or "white", while in the case of storage in continuously encoded form the pit is able to adopt any of the "gray values" lying in between.

FIG. 6 illustrates diagrammatically how the information stored in the adhesive security tape 1 can be read. For that purpose, coherent light from a laser (preferably with a wavelength which is absorbed only slightly if at all by the absorber layer 6) is directed onto the outside 3 of the adhesive security tape 1. (Alternatively, it is also possible to use a very bright LED, which in some circumstances even leads to better results, especially in respect of a reduction in what is known as speckle noise.) For ease of comprehension, FIG. 6 depicts only a small section of this coherent light, which is preferably incident in parallel (incident read beam), namely the incident lightwaves labeled 26 and 27. In practice, the coherent light is directed extensively onto the adhesive security tape 1 and covers a region of, for example, 1 mm². This is because the light emanating from numerous pits 20 has to be detected in order to reconstruct the stored information. The intensity of the incident read beam is too weak to alter the interface structure of the polymer film 2 or of the absorbent layer 6 and thus the stored information.

The lightwaves 26 and 27 have a solid phase $\Phi$ to one another. For practical reasons they strike the outside 3 of the polymer film 2 at an angle, pass through the polymer film 2, and are partly reflected at the reflection layer 4, so that reflected lightwaves 28 and 29 emanate from the reflection layer 4 and again pass through the polymer film 2. For ease of comprehension, the fraction of the incident lightwaves 26 and 27 which passes through the partly transparent reflection layer 4 is not shown in FIG. 6. Since the local interface structure of the polymer film 2 is varied by way of pits 20, a phase shift occurs, and the reflected lightwaves 28 and 29 emerge with a phase $\Psi$, as illustrated in FIG. 6. A consequence of this is that lightwaves containing phase information emanate in numerous directions from the hologram 12 in the adhesive security tape 1, in the manner of a diffraction grating. At some distance from the adhesive security tape 1 it is possible, using a detector, to detect a holographic image which comes about through interference between these lightwaves and represents a reconstruction of the stored information.

In accordance with FIG. 6, the adhesive security tape 1 is located in an intact state. It can be seen that the relieflike interface structure of the polymer film 2 or of the reflection layer 4 connected firmly to the polymer film 2, said structure being defined by the pits 20, is a "negative" of the local interface structure of the absorber layer 6. When a hologram is read, however, it is unimportant whether a "negative" or a "positive" is used as the holographic structure; both forms produce the same holographic image.

Consequently, the hologram fragment 17 formed by the relieflike interface structure of the absorber layer 6 contains the same information as the hologram fragment 16. Following the detachment of the upper part 14 from the lower part 15, the holographic information can be read from the upper part 14 in reflection at the reflection layer 4, in other words essentially as illustrated by FIG. 6. For reading the hologram fragment 17 it is possible to utilize a reflection on the upper face of the absorber layer 6, which is then exposed.

In the example described, holographic information is written via the local interface structure of the polymer film or of the absorber layer. In the case of one other possibility, the refractive index of the polymer film is changed locally by heating, with consequences for the phase position of light passing through the polymer film. In this case as well it is possible to use a laser lithography device to write the information, in a manner similar to that already explained. Hybrid forms of these two methods are particularly advantageous, since they provide high contrast.

Where solely the refractive index is varied in the polymer film, and if no relieflike interface structure is impressed on the absorber layer, it is possible to use an absorber dye which changes its absorption capacity on absorbing the write beam. Accordingly, when holographic information is being written, a refractive phase hologram is formed in the polymer film and an absorption hologram is formed in the absorber layer. For reading, a beam is passed through both the polymer film and the absorber layer, which is why an additional reflection layer between the absorber layer and the adhesive layer is useful.

However, even if a relief structure is formed at the interface of the absorber layer, an absorber dye which locally changes its absorption capacity on absorbing the write beam has advantages in use owing to a contrast-enhancing effect.

In principle, there need not be any additional reflection layer in the adhesive security tape, since light is reflected anyway at interfaces between substances differing in refractive index. Reflection layers such as the partly transparent reflection layer 4, however, make the handling of the adhesive security tape 1 much easier.

What is claimed is:

1. An adhesive security tape comprising:
    a polymer film whose refractive index and/or interface structure can be changed locally by heating,
    an absorber layer disposed below the polymer film and comprising an absorber dye which is set up at least partly to absorb a write beam directed onto the absorber layer, to transfer at least some of the heat generated to the polymer film locally, and in doing so to undergo local change itself, and
    an adhesive layer disposed below the absorber layer,
    wherein at least the polymer film is less strongly adhered to the absorber layer than at least the absorber layer is adhered to the adhesive layer.

2. The tape of claim 1, wherein the interface structure of the polymer film can be changed locally by heating, holographic information being writable via the local interface structure of the polymer film.

3. The tape of claim 2, wherein the absorber layer is set up to adopt an interface structure which corresponds to the local interface structure of the polymer film, when a write beam is absorbed.

4. The tape of claim 1, wherein the refractive index of the polymer film can be changed locally by heating.

5. The tape of claim 1, wherein the absorber dye is set up to undergo local change in its optical properties when a write beam is absorbed.

6. The tape of claim 5, wherein the absorber dye undergoes local changes in its absorption capacity when a write beam is absorbed.

7. The tape of claim 1, wherein disposed between the polymer film and the absorber layer there is a partly transparent reflection layer, the adhesion between the polymer film and the reflection layer being greater than the adhesion between the reflection layer and the absorber layer.

8. The tape of claim 1, wherein the reflection layer has a thickness in the range from 1 nm to 50 nm.

9. The tape of claim 7, wherein the reflection layer comprises aluminum.

10. The tape of claim 7, wherein the polymer film is oriented.

11. The tape of claim 10, wherein the polymer film is biaxially oriented.

12. The tape of claim 1, wherein the polymer film comprises a material selected from the following group: polypropylene, polyvinyl chloride, polyester, polyethylene terephthalate, polyethylene naphthalate, polymethylpentene, and polyimide.

13. The tape of claim 1, wherein the absorber layer comprises a binder and has a thickness in the range from 0.1 $\mu$m to 10 $\mu$m.

14. The tape of claim 1, wherein the polymer film is set up as the outer layer and as a bearing structure of the tape.

15. The tape of claim 1, comprising written holographic information.

16. A process for entering holographic information into an adhesive security tape as claimed in claim 1, where holographic information present in a hologram of a storage object is calculated as a two-dimensional array and a write beam of a write device is directed onto the absorber layer and is controlled in accordance with the two-dimensional array in such a way that the local refractive index and/or interface structure of the polymer film is adjusted in accordance with the holographic information and the absorber layer is locally changed in accordance with the holographic information.

17. The process of claim 16, the tape having a partly transparent reflection layer disposed between the polymer film and the absorber layer, wherein the write beam is focused by evaluating its reflection returned from the reflection layer.

18. The process of claim 16, wherein the holographic information is entered in the form of pits of predetermined size.

19. The process of claim 18, wherein the holographic information is stored in binary-encoded form in a pit.

20. The process of claim 18, wherein the holographic information is stored in continuously encoded form in a pit, the local properties of the polymer film being adjusted in the pit in accordance with a value from a predetermined range of values.

21. The process of claim 16, wherein the write device comprises a laser lithography device.

22. An adhesive security tape, comprising:

an adhesive layer having a first surface for adhering the tape to a substrate, and a second surface; and an absorbing layer and a polymer film disposed in this order on the second-surface-side of the adhesive layer, wherein the absorbing layer undergoes local changes when heated and transfers at least some of the heat to the polymer film to effect corresponding local changes therein, and the adhesion of the adhesive layer to a layer contacting the second surface thereof is greater than the adhesion of the polymer film to a layer contacting the locally-changed surface thereof.

23. The tape of claim 22, wherein the layer contacting the second surface of the adhesive layer comprises the absorbing layer.

24. The tape of claim 22, wherein the layer contacting the second surface of the adhesive layer comprises a partly transparent reflecting layer.

25. The tape of claim 24, wherein one surface of the partly transparent reflecting layer contacts the adhesive layer and another surface contacts the absorbing layer.

26. The tape of claim 22, wherein the layer contacting the locally-changed surface of the polymer layer comprises a partly transparent reflecting layer.

27. The tape of claim 22, wherein the layer contacting the locally-changed surface of the polymer layer comprises the absorber layer.

28. The tape of claim 22, wherein the local changes of the polymer film comprise refractive index changes.

29. The tape of claim 22, wherein the local changes of the polymer film comprise interface structure changes.

30. The tape of claim 22, wherein the local changes of the absorber layer comprise absorption capacity changes.

31. The tape of claim 22, wherein the polymer layer is removable from the tape while at least the adhesive layer and the absorbing layer of the tape remain on the substrate.

32. An adhesive security tape, comprising:

an adhesive layer;

an absorber layer;

a polymer layer; and information formed partly in the absorber layer and partly in the polymer layer.

33. The tape of claim 32, wherein the information comprises a hologram.

34. The tape of claim 32, wherein the adhesive layer adheres the tape to a substrate and the polymer layer is removable from the tape while at least the adhesive layer and the absorber layer of the tape remain on the substrate.

35. The tape of claim 32, further comprising:

a partly transparent reflecting layer provided between the absorber layer and the polymer layer film.

36. The tape of claim 32, further comprising:

a partly transparent reflecting layer provided between the absorber layer and the adhesive layer.

* * * * *